(12) United States Patent
Jang et al.

(10) Patent No.: US 12,631,763 B2
(45) Date of Patent: May 19, 2026

(54) VEHICLE AND NODE POSITIONING METHOD

(71) Applicants: Hyundai Motor Company, Seoul (KR); Kia Corporation, Seoul (KR)

(72) Inventors: Yocheol Jang, Suwon-si (KR); Donghee Seok, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 352 days.

(21) Appl. No.: 18/308,889

(22) Filed: Apr. 28, 2023

(65) Prior Publication Data

US 2024/0125943 A1 Apr. 18, 2024

(30) Foreign Application Priority Data

Oct. 17, 2022 (KR) ........................ 10-2022-0133411

(51) Int. Cl.
H04W 4/02 (2018.01)
G01S 5/02 (2010.01)
(Continued)

(52) U.S. Cl.
CPC ............ G01S 19/31 (2013.01); G01S 5/0284 (2013.01); G01S 19/252 (2013.01); G01S 19/26 (2013.01)

(58) Field of Classification Search
CPC ........ G01S 5/0249; G01S 19/14; G01S 19/31; G01S 19/393; G01S 19/485; G01S 5/0072; G01S 5/021; G01S 5/0284; G01S 19/252; G01S 19/26; G01S 19/40; G01S 19/48; G01S 19/51
(Continued)

(56) References Cited

U.S. PATENT DOCUMENTS

2010/0265140 A1* 10/2010 Sohn ..................... G01S 5/0072
342/450
2020/0110183 A1* 4/2020 Won ..................... G08G 1/0965
(Continued)

FOREIGN PATENT DOCUMENTS

KR 20090040093 A 4/2009
KR 101750906 B1 7/2017
(Continued)

OTHER PUBLICATIONS

IP.com search history (Year: 2025).*

*Primary Examiner* — Moustapha Diaby
(74) *Attorney, Agent, or Firm* — Slater Matsil, LLP

(57) ABSTRACT

A vehicle includes a signal transmission part configured to transmit a signal for wireless network connection to an outside of a shaded area where a GPS signal is not received based on the vehicle having entered the shaded area. A positioning part is configured to communicate with a vehicle located outside the shaded area, to receive the signal, and to calculate a relative position of the vehicle. A first position correction part is configured to correct a current position of the vehicle based on a number of vehicles included in the other vehicle that have received the signal. A second position correction part is configured to correct the current position of the vehicle after passing through the shaded area based on location information of the vehicle in the shaded area and GPS information of the vehicle after passing through the shaded area.

17 Claims, 6 Drawing Sheets

MOBILE NODE HAVING ENTERED SHADED AREA WHERE GPS SIGNAL IS NOT RECEIVED TRANSMITS SIGNAL FOR WIRELESS NETWORK CONNECTION TO AREA OUTSIDE SHADED AREA ~S11

BY PERFORMING COMMUNICATION AMONG NEIGHBORING NODES RECEIVING SIGNAL FOR WIRELESS NETWORK AND LOCATED OUTSIDE SHADED AREA, AND AMONG NEIGHBORING NODES AND MOBILE NODE, WIRELESS NETWORK CONNECTION AMONG NEIGHBORING NODES AND MOBILE NODE IS ESTABLISHED, AND RELATIVE POSITION OF MOBILE NODE IS CALCULATED ~S21

MOBILE NODE HAVING PASSED THROUGH SHADED AREA CORRECTS CURRENT POSITION OF MOBILE NODE, BASED ON LOCATION INFORMATION OF MOBILE NODE AND GPS INFORMATION OF MOBILE NODE AFTER PASSING THROUGH SHADED AREA ~S31

MOBILE NODE DISCONTINUES WIRELESS NETWORK CONNECTION WITH OTHER NODES ~S41

(51) Int. Cl.
    *G01S 19/25*       (2010.01)
    *G01S 19/26*       (2010.01)
    *G01S 19/31*       (2010.01)
    *H04W 64/00*     (2009.01)

(58) Field of Classification Search
    USPC ...................................................... 455/456.1
    See application file for complete search history.

(56)                   References Cited

U.S. PATENT DOCUMENTS

| | | | |
|---|---|---|---|
| 2020/0370894 A1* | 11/2020 | Kim | G01C 21/30 |
| 2022/0179104 A1* | 6/2022 | Hamada | G01S 19/50 |
| 2022/0375354 A1* | 11/2022 | Kang | H04W 84/20 |
| 2023/0249693 A1* | 8/2023 | Mukundan | G06V 40/193 |
| | | | 340/425.5 |

FOREIGN PATENT DOCUMENTS

| | | |
|---|---|---|
| KR | 101755944 B1 | 7/2017 |
| KR | 102322480 B1 | 11/2021 |
| KR | 20220052381 A | 4/2022 |

* cited by examiner

Figure 1:
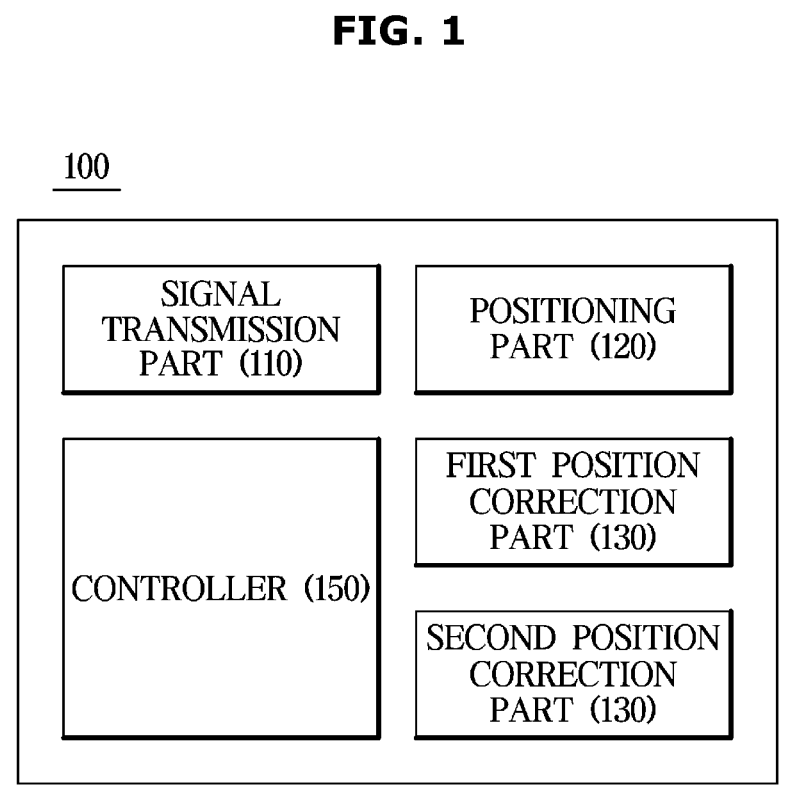

| | |
|---|---|
| SIGNAL TRANSMISSION PART (110) | POSITIONING PART (120) |
| CONTROLLER (150) | FIRST POSITION CORRECTION PART (130) |
| | SECOND POSITION CORRECTION PART (130) |

FIG. 2

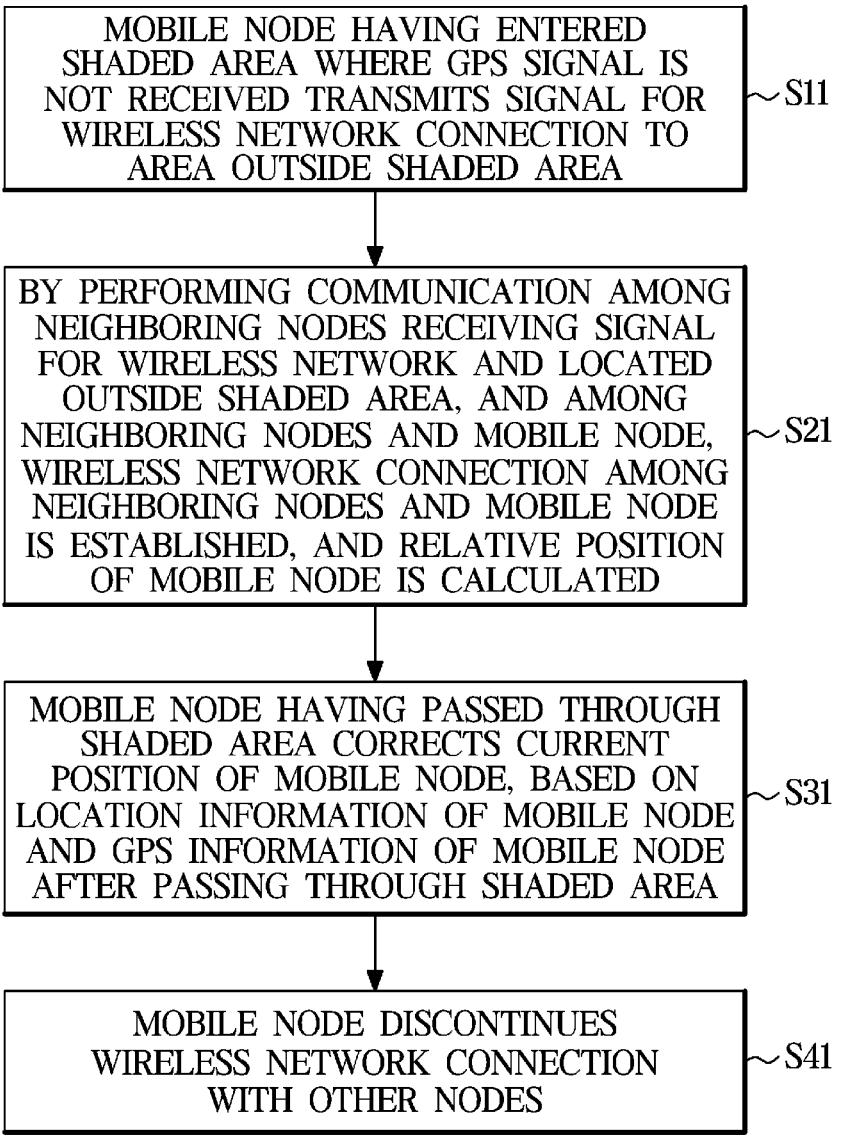

MOBILE NODE HAVING ENTERED SHADED AREA WHERE GPS SIGNAL IS NOT RECEIVED TRANSMITS SIGNAL FOR WIRELESS NETWORK CONNECTION TO AREA OUTSIDE SHADED AREA  ～S11

BY PERFORMING COMMUNICATION AMONG NEIGHBORING NODES RECEIVING SIGNAL FOR WIRELESS NETWORK AND LOCATED OUTSIDE SHADED AREA, AND AMONG NEIGHBORING NODES AND MOBILE NODE, WIRELESS NETWORK CONNECTION AMONG NEIGHBORING NODES AND MOBILE NODE IS ESTABLISHED, AND RELATIVE POSITION OF MOBILE NODE IS CALCULATED  ～S21

MOBILE NODE HAVING PASSED THROUGH SHADED AREA CORRECTS CURRENT POSITION OF MOBILE NODE, BASED ON LOCATION INFORMATION OF MOBILE NODE AND GPS INFORMATION OF MOBILE NODE AFTER PASSING THROUGH SHADED AREA  ～S31

MOBILE NODE DISCONTINUES WIRELESS NETWORK CONNECTION WITH OTHER NODES  ～S41

VEHICLE AND NODE POSITIONING METHOD

CROSS-REFERENCE TO RELATED APPLICATIONS

This application claims the benefit of Korean Patent Application No. 10-2022-0133411, filed on Oct. 17, 2022, which application is hereby incorporated herein by reference.

TECHNICAL FIELD

The disclosure relates to a vehicle and a node positioning method.

BACKGROUND

Research on a technology capable of locating a vehicle even in a global positioning system (GPS)-shaded area where a GPS signal is not received such as tunnels or underground roads has been being carried out. For example, Kakao Mobility's fused indoor localization (FIN) technique, which has been serviced in tunnels and underground roads nationwide, learns long-term evolution (LTE) signal data for each user's location, stores in advance on a map, and matches with a mobile signal pattern of a specific user passing a corresponding area through comparison and analysis, thereby identifying a current position on the map.

In addition to the above-described method using a mobile LTE base station infrastructure and beacon infrastructure, a moving object such as a vehicle has also used positioning methods based on a gyro device and camera image processing. However, such positioning methods have significant data error compared to a fixed infrastructure-based positioning method.

When using a fixed infrastructure, a position of a vehicle may be measured more precisely. However, for example, in order to measure a position of a vehicle having entered a GPS-shaded area using a fixed infrastructure, positioning facilities are required to be installed in the corresponding shaded area, resulting in installation costs and usage fees.

SUMMARY

An embodiment of the disclosure provides a vehicle and a node positioning method. Particular embodiments provide a vehicle and a node positioning method that may effectively measure a position of a node in a shaded area through communication among nodes.

Additional embodiments of the disclosure will be set forth in part in the description which follows and, in part, will be obvious from the description, or may be learned by practice of the disclosure.

According to an embodiment of the disclosure, there is provided a vehicle including a signal transmission part configured to transmit a signal for wireless network connection to an outside of a shaded area where a global positioning system (GPS) signal is not received, based on the vehicle having entered the shaded area, and a positioning part configured to communicate with another vehicle located outside the shaded area and receiving the signal and to calculate a relative position of the vehicle.

The positioning part may be configured to calculate the relative position based on a triangulation.

The vehicle may further include a first position correction part configured to correct a current position of the vehicle in the shaded area, using at least one of information about the relative position, GPS information of the vehicle before entering the shaded area, precision map information, or a dead reckoning (DR) algorithm.

The vehicle may further include a second position correction part configured to correct a current position of the vehicle after passing through the shaded area, based on location information of the vehicle in the shaded area and GPS information of the vehicle after passing through the shaded area.

According to another embodiment of the disclosure, there is provided a node positioning method including transmitting, by a mobile node having entered a shaded area where a GPS signal is not received, a signal for wireless network connection to an area outside the shaded area, performing communication among neighboring nodes located outside the shaded area and receiving the signal and among the neighboring nodes and the mobile node to establish the wireless network connection among the neighboring nodes and the mobile node, and calculating a relative position of the mobile node.

The transmitting of the signal may transmit, by the mobile node, an ultra-wideband (UWB) signal, and may request a neighboring node receiving the transmitted UWB signal for the wireless network connection.

The calculating of the relative position of the mobile node may receive, by at least two neighboring nodes having GPS information, the UWB signal to calculate the relative position of the mobile node based on the GPS information of the at least two neighboring nodes.

The calculating of the relative position of the mobile node may calculate the relative position of the mobile node based on a triangulation.

The node positioning method may further include correcting, by the mobile node, a current position of the mobile node in the shaded area using at least one of information about the relative position of the mobile node, GPS information of the mobile node before entering the shaded area, precision map information, or a DR algorithm.

Based on a number of neighboring nodes receiving the signal and having GPS information being less than two, the node positioning method may further include calculating, by the mobile node, a current position of the mobile node in the shaded area using at least one of GPS information of the mobile node before entering the shaded area, precision map information, or a DR algorithm.

The node positioning method may further include receiving, by the neighboring node, the relative position of the mobile node through a vehicle-to-vehicle (V2V) communication and correcting a current position of the neighboring node using at least one of GPS information of the neighboring node, the relative position of the mobile node, distance information between the mobile node and the neighboring node, or precision map information.

The node positioning method may further include, after passing through the shaded area, correcting, by the mobile node, a current position of the mobile node after passing through the shaded area based on location information of the mobile node in the shaded area and GPS information of the mobile node after passing through the shaded area.

The mobile node after passing through the shaded area may be configured to discontinue the wireless network connection based on a number of nodes having passed through the shaded area exceeding two including the mobile node.

The node positioning method may further include performing, by the neighboring node having entered the shaded area, UWB communication with another node located outside the shaded area and correcting a current position of the neighboring node using at least one of relative position information of the neighboring node calculated through the UWB communication with the other node, GPS location information of the neighboring node before entering the shaded area, precision map information, or a DR algorithm.

Based on a number of nodes having entered the shaded area exceeding a preset number before transmitting the signal, the node positioning method may further include grouping the nodes located in the shaded area with nodes located outside the shaded area into a plurality of groups and forming a subnet for each group.

The forming of the subnet may be performed so that a total number of hops between each of the nodes does not exceed a preset number.

BRIEF DESCRIPTION OF THE DRAWINGS

These and/or other embodiments of the disclosure will become apparent and more readily appreciated from the following description of the embodiments, taken in conjunction with the accompanying drawings, in which:

FIG. 1 is a control block diagram illustrating constituent components of a vehicle according to an embodiment;

FIG. 2 is a flowchart illustrating a node positioning method according to an embodiment;

DETAILED DESCRIPTION OF ILLUSTRATIVE EMBODIMENTS

Figure 3:
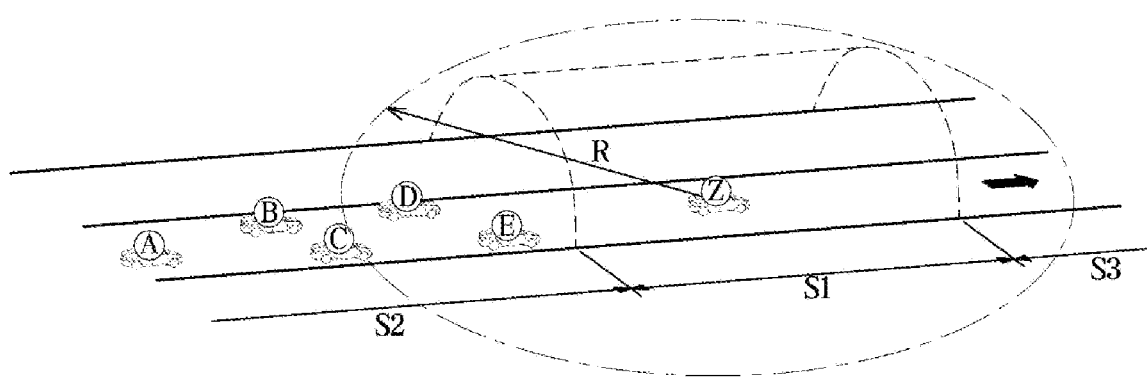
FIGS. 3 to 5 are diagrams illustrating examples of nodes having entered a shaded area and nodes moving outside the shaded area according to an embodiment.

Like reference numerals throughout the specification denote like elements. Also, this specification does not describe all of the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the term "include" when used in this specification specifies the presence of stated features, integers, steps, operations, elements, and/or components, but does not preclude the presence or addition of at least one other feature, integer, step, operation, element, component, and/or group thereof.

It is to be understood that the singular forms are intended to include the plural forms as well, unless the context clearly dictates otherwise.

The terms such as "~part", "~device", "~block", "~member", "~module", and the like may refer to a unit for processing at least one function or act. For example, the terms may refer to at least process processed by at least one hardware, such as a field-programmable gate array (FPGA)/application specific integrated circuit (ASIC), or software stored in memories or processors.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described in detail with reference to the accompanying drawings.

FIG. 1 is a control block diagram illustrating constituent components of a vehicle according to an embodiment.

Referring to FIG. 1, a vehicle 100 according to an embodiment includes a signal transmission part no and a positioning part 120. In this instance, when the vehicle 100 enters a shaded area where a global positioning system (GPS) signal is not received, the signal transmission part no transmits a signal for wireless network connection to an area outside of the shaded area, and the positioning part 120 communicates with another vehicle located outside the shaded area and receiving the signal and calculates a relative position of the vehicle.

Here, the signal transmission part no may perform ultra-wideband (UWB) short-range communication with other vehicles located outside the shaded area, without being limited thereto. That is, a variety of known communication methods may be used. In the embodiment below, the UWB communication is described as an example of short-range communication among nodes.

Also, the signal transmission part no may discontinue the wireless network connection with the other nodes after the vehicle 100 passes through the shaded area. For example, when the number of vehicles having passed through the shaded area exceeds two including the vehicle 100, the signal transmission part no may discontinue the wireless network connection with the other vehicles by stopping signal transmission for wireless network connection.

For example, the positioning part 120 may calculate the relative position of the vehicle 100 based on a triangulation. That is, while receiving and transmitting data between the vehicle 100 located in the shaded area and vehicles located outside the shaded area, the positioning part 120 may receive signals from two vehicles located outside the shaded area and having GPS information and may measure a relative difference in signal arrival time, thereby measuring the relative position.

According to an embodiment, the vehicle 100 may include a first position correction part 130 correcting a current position of the vehicle 100 having entered the shaded area.

For example, when the number of vehicles receiving the signal for wireless network connection from the signal transmission part no and located outside the shaded area is greater than or equal to at least two, a relative position of the vehicle 100 in the shaded area may be calculated using GPS information of the vehicles located outside the shaded area.

In this case, the first position correction part 130 may correct the current position of the vehicle 100 in the shaded area using at least one of information about the above-described relative position, GPS information of the vehicle 100 before entering the shaded area, precision map information, or a dead reckoning (DR) algorithm. Here, for example, the precision map may be generated by scanning a surrounding terrain using a vehicle equipped with a mobile mapping system (MMS) and processing three-dimensional (3D) data.

Also, when the number of vehicles receiving the signal for wireless network connection from the signal transmission part no and located outside the shaded area is less than two, the first position correction part 130 may correct the current position of the vehicle 100 in the shaded area using at least one of GPS information of the vehicle 100 before entering the shaded area, the precision map information, or the DR algorithm.

According to an embodiment, the vehicle 100 may include a second position correction part 140 correcting a current position of the vehicle 100 after passing through the shaded area based on location information of the vehicle 100 in the shaded area and GPS information of the vehicle 100 after passing through the shaded area.

The vehicle 100 may confirm the GPS information of the vehicle 100 after passing through the shaded area and may correct the current position of the vehicle 100 using location information of the vehicle 100 in the shaded area of the vehicle 100 by the second position correction part 140 for accurate current position measurement.

In this instance, the second position correction part 140 may calculate a weight by comparing a value, input through sensors such as a camera, a laser imaging, detection, and ranging (lidar), a radar, a GPS sensor, and the like, with the precision map using a particle filter and may use the calculated weight for correcting the current position of the vehicle 100.

According to an embodiment, the vehicle 100 may include a controller 150 controlling constituent components of the vehicle 100 and means related thereto. The controller 150 may include various types of processors and memories. The memory may store programs, instructions, applications, etc., for control. Each processor may execute the programs, the instructions, the applications, etc., stored in the memory. For example, the controller 150 may include control units such as an electronic control unit (ECU), a micro controller unit (MCU), and the like.

The memory may include a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD) or a compact disc read only memory (CD-ROM), without being limited thereto. The memory may store, for example, GPS information of the vehicle 100, a precision map, an algorithm, network information, location information, and the like.

FIG. 2 is a flowchart illustrating a node positioning method according to an embodiment. Hereinafter, to help understanding, a vehicle having entered a shaded area where a GPS signal is not received is referred to as a mobile node, and a vehicle moving outside the shaded area is referred to as a neighboring node. The vehicles may include the constituent components of FIG. 1. A tunnel is described as an example of the shaded area where a GPS signal is not received.

First, a mobile node having entered a shaded area where a GPS signal is not received transmits a signal for wireless network connection to an area outside the shaded area (S11). For example, the mobile node may transmit a UWB signal and request a neighboring node receiving the transmitted UWB signal for wireless network connection.

Afterwards, by performing short-range communication among neighboring nodes located outside the shaded area and receiving the signal for wireless network from the mobile node having entered the shaded area, and among the neighboring nodes and the mobile node, the wireless network connection among the neighboring nodes and the mobile node is established, and a relative position of the mobile node is calculated (S21).

In operation S21, at least two neighboring nodes having GPS information may receive the UWB signal from the mobile node, and the relative position of the mobile node may be calculated by the positioning part 120 based on the GPS information of each of the neighboring nodes.

In this instance, for example, the positioning part 120 may calculate the relative position based on a triangulation.

Also, the mobile node in the shaded area may correct a current position of the mobile node in the shaded area using at least one of information about the relative position of the mobile node, GPS information of the mobile node before entering the shaded area, precision map information, or a DR algorithm.

For example, when the number of neighboring nodes located outside the shaded area and receiving the UWB signal from the mobile node is less than two, the mobile node may calculate the current position of the mobile node in the shaded area using at least one of the GPS information of the mobile node before entering the shaded area, the precision map information, or the DR algorithm.

Also, the neighboring node may receive the relative position of the mobile node through vehicle-to-vehicle (V2V) communication and may correct a current position of the neighboring node using at least one of GPS information of the neighboring node, the relative position of the mobile node, distance information between the neighboring node and the mobile node, or the precision map.

Here, the neighboring node may calculate a weight by comparing a value, input through sensors such as a camera, a lidar, a radar, a GPS sensor, and the like, with the precision map using a particle filter and may use the calculated weight for correcting a current position of the neighboring node.

Afterwards, the mobile node having passed through the shaded area corrects a current position of the mobile node after passing through the shaded area based on location information of the mobile node in the shaded area and GPS information of the mobile node after passing through the shaded area (S31).

In operation S31, the mobile node may confirm the GPS information of the mobile node after passing through the shaded area and may correct the current position using the location information of the mobile node in the shaded area. In this instance, a weight may be calculated by comparing a value, input through sensors such as a camera, a lidar, a radar, a GPS sensor, and the like, with the precision map using a particle filter, and the calculated weight may be used for correcting the current position of the mobile node.

Afterwards, when the total number of nodes having passed through the shaded area exceeds two including the mobile node itself, the mobile node discontinues the wireless network connection with other nodes (S41).

To this end, the mobile node may withdraw from the wireless network connected to the other nodes by stopping signal transmission of the UWB signal.

Also, after the neighboring node enters the shaded area, the neighboring node may perform UWB communication with other nodes located outside the shaded area and may correct a current position of the neighboring node using at least one of relative position information of the neighboring node calculated through the UWB communication with the other nodes, GPS location information of the neighboring node before entering the shaded area, the precision map information, or the DR algorithm.

The above-described operations S11 to S31 may be performed in units of subnet. For example, when the number of nodes having entered the shaded area exceeds a preset number, the nodes located in the shaded area and the nodes located outside the shaded area may be grouped into a plurality of groups, and a subnet may be formed for each group.

Forming the subnet may be performed by a vehicle management server (not shown) that provides a connected car service. The vehicle management server (not shown) may group the nodes in the shaded area and the nodes outside the shaded area, but may form a subnet for each group so that the total number of hops between each node does not exceed a preset number.

For example, the nodes in the shaded area and the nodes outside the shaded area may be grouped so that the total number of hops does not exceed ten.

Figure 4:
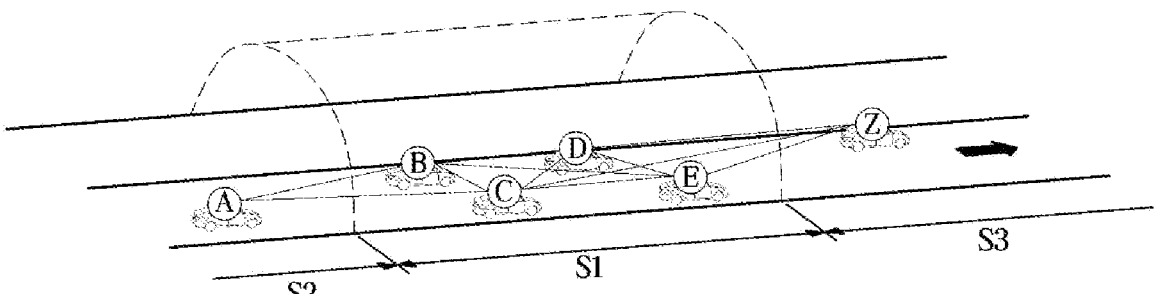
Figure 5:
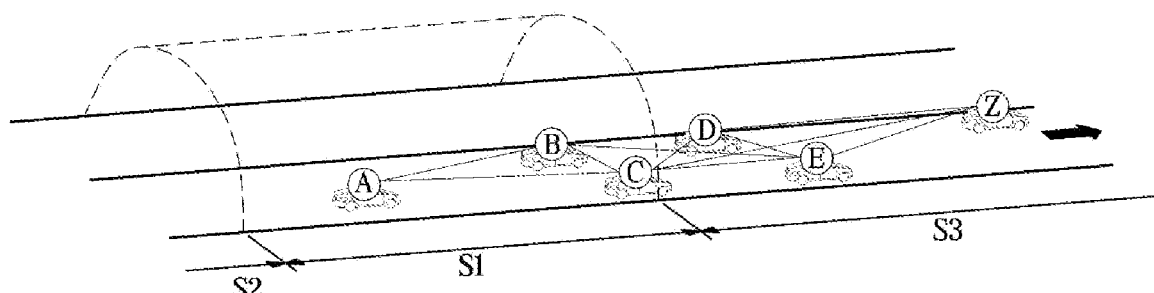

FIGS. 3 to 5 are diagrams illustrating examples of nodes having entered a shaded area and nodes moving outside the shaded area according to an embodiment.

As shown in FIG. 3, when entering a shaded area S1 such as a tunnel where a GPS signal is not received, a mobile node Z transmits a UWB signal for wireless network connection to areas S2 and S3 outside the shaded area S1.

Through the above, wireless network connection is established among the mobile mode Z and neighboring nodes C, D, and E of the area S2 located within a propagation radius R of the UWB signal.

The neighboring nodes C, D, and E receive the UWB signal from the mobile node Z and perform wireless communication among the neighboring nodes C, D, and E and among the mobile node Z and the neighboring nodes C, D, and E.

The neighboring nodes C, D, and E know their own GPS information (coordinate values) and serve as anchor nodes, and a relative position of the mobile node Z may be calculated by transmitting and receiving data among the neighboring nodes C, D, and E and among the mobile node Z and the neighboring nodes C, D, and E. For example, the relative position of the mobile node Z may be calculated by a triangulation.

In this instance, at least two neighboring nodes C, D, and E having own GPS information receive the UWB signal, and thus the relative position of the mobile node Z may be calculated based on the GPS information of the at least two neighboring nodes C, D, and E.

That is, when a UWB network is established among the nodes Z, C, D, and E, distances of each of the nodes may be measured by a method such as a time difference of arrival (TDOA) and the like, thereby identifying the relative position. When at least two nodes having the information of GPS coordinates exist, relative coordinates may be replaced with absolute coordinates, and a position on a map of each of the nodes bound by the network may be identified.

Referring to FIG. 4, a plurality of nodes B, C, D, and E having entered the shaded area S1 may correct a current position of each of the nodes B, C, D, and E using at least one of relative position information of the nodes B, C, D, and E calculated through UWB communication with other nodes A and Z located outside the shaded area S1, GPS location information of the nodes B, C, D, and E before entering the shaded area S1, a precision map, or a DR algorithm.

Referring to FIG. 5, the mobile node Z having passed through the shaded area S1 may correct current position information of the mobile node Z based on location information of the mobile node Z before passing through the shaded area S1 and GPS information of the mobile node Z. In this instance, a weight may be calculated by comparing a value, input through sensors such as a camera, a lidar, a radar, a GPS sensor, and the like, with the precision map using a particle filter, and the calculated weight may be used to correct the current position of the mobile node Z.

In addition, when the number of nodes D and E having passed through the shaded area S1 exceeds two including the mobile node Z itself, the mobile node Z located in the lead may withdraw from the wireless network currently connected with other nodes.

To this end, the mobile node Z may discontinue the wireless network connection with the other nodes by turning off the UWB communication. Through the above, resource consumption such as power due to the wireless network connection may be reduced.

Meanwhile, because positioning is performed through a mobile network without an infrastructure, the number of anchor nodes having absolute position information may not satisfy a necessary and sufficient condition for positioning. For example, when the number of anchor nodes is one, an absolute speed of the node Z may be calculated. Accordingly, a speed of each node in a moving direction may be inferred using relative speed variations of the remaining nodes. However, because only one anchor node exists, an absolute position may not be inferred.

When the node Z is only one of the anchor nodes having passed through a shaded area and other nodes A, B, C, D, and E are located in the shaded area, for example, a position of the node A with respect to the node Z as a central axis may not be accurately determined.

Also, according to another embodiment, a network creation trigger may be performed before entering a shaded area based on a navigation map. For example, in a state where all of the nodes A, B, C, D, E, and Z have not yet entered a shaded area, the mobile node Z a few seconds before entering the shaded area may transmit a signal to create a network with other nodes within a signal radius, and when entering the shaded area S1, may perform positioning in real time without interruption.

Figure 6:
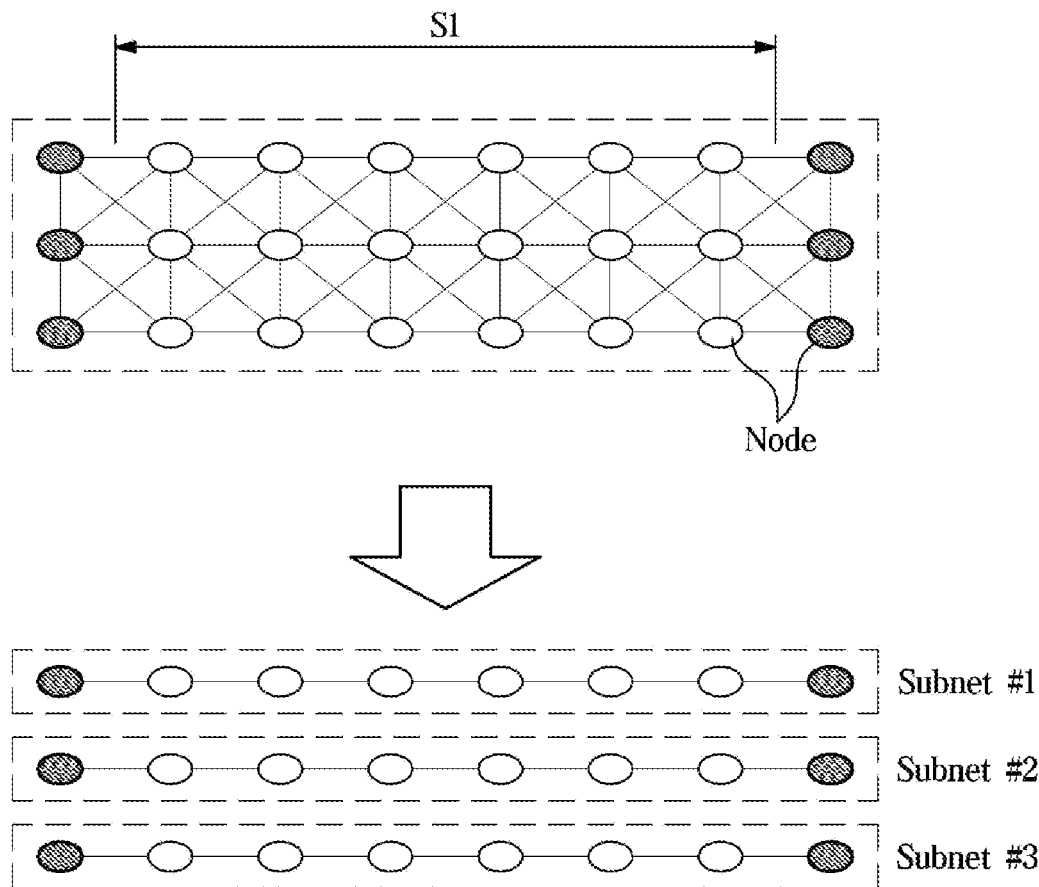
FIG. 6 illustrates an example of forming subnets by grouping nodes located in a shaded area and nodes located outside the shaded area according to an embodiment.

FIG. 6 illustrates an example of forming subnets by grouping nodes located in a shaded area and nodes located outside the shaded area according to an embodiment.

Referring to FIG. 6, when the number of nodes having entered a shaded area S1 exceeds a preset number, nodes located in the shaded area S1 and nodes located outside the shaded area S1 may be grouped into a plurality of groups, and a subnet for each group may be formed.

That is, a vehicle management server (not shown) providing a connected car service may receive location information of each vehicle and may group nodes in the shaded area and nodes located outside the shaded area into respective subnets.

In this instance, the nodes in the shaded area and the nodes located outside the shaded area may be grouped into subnets so that the total number of hops does not exceed ten.

Through the above, an increase in network cost and a frequency of error signals due to the increase in the number of hops may be effectively reduced.

As is apparent from the above, according to the embodiments of the disclosure, the vehicle and the node positioning method can effectively measure a position of a node in a shaded area through communication among nodes.

According to the embodiments of the disclosure, a position of a node having entered a shaded area can be measured based on a UWB technology in an environment without fixed infrastructures.

Although embodiments have been described for illustrative purposes, those skilled in the art will appreciate that various modifications, additions, and substitutions are possible, without departing from the scope and spirit of the disclosure. Therefore, embodiments have not been described for limiting purposes.

What is claimed is:

1. A vehicle comprising:
a signal transmission part configured to transmit a signal for wireless network connection to an outside of a shaded area where a global positioning system (GPS) signal is not received based on the vehicle having entered the shaded area;
a positioning part configured to communicate with at least one other vehicle located outside the shaded area, to receive the signal, and to calculate a relative position of the vehicle;
a first position correction part configured to correct a current position of the vehicle based on a number of vehicles included in the at least one other vehicle that have received the signal; and
a second position correction part configured to correct the current position of the vehicle after passing through the shaded area based on location information of the vehicle in the shaded area and GPS information of the vehicle after passing through the shaded area.

2. The vehicle of claim 1, wherein the positioning part is configured to calculate the relative position based on a triangulation.

3. The vehicle of claim 1, wherein the first position correction part is configured to correct the current position of the vehicle in the shaded area using information about the relative position, GPS information of the vehicle before entering the shaded area, precision map information, or a dead reckoning algorithm.

4. A node positioning method, the method comprising:
transmitting, by a mobile node having entered a shaded area where a GPS signal is not received, a signal for wireless network connection to an area outside the shaded area;
performing communication, among neighboring nodes located outside the shaded area and receiving the signal and among the neighboring nodes and the mobile node, to establish the wireless network connection among the neighboring nodes and the mobile node;
calculating a relative position of the mobile node;
calculating a current position of the mobile node based on a number of neighboring nodes that have received the signal; and
after passing through the shaded area, correcting, by the mobile node, the current position of the mobile node after passing through the shaded area based on location information of the mobile node in the shaded area and GPS information of the mobile node after passing through the shaded area.

5. The method of claim 4, wherein calculating the current position of the mobile node comprises, based on a number of the neighboring nodes receiving the signal and having GPS information being less than two, calculating, by the mobile node, the current position of the mobile node in the shaded area using GPS information of the mobile node before entering the shaded area, precision map information, or a dead reckoning algorithm.

6. The method of claim 4, further comprising:
receiving, by a first neighboring node of the neighboring nodes, the relative position of the mobile node through a vehicle-to-vehicle (V2V) communication; and
correcting a current position of the first neighboring node using GPS information of the first neighboring node, the relative position of the mobile node, distance information between the mobile node and the first neighboring node, or precision map information.

7. The method of claim 4, wherein the mobile node, after passing through the shaded area, discontinues the wireless network connection based on a number of nodes, including the mobile node, having passed through the shaded area exceeding two.

8. The method of claim 4, further comprising:
performing, by a first neighboring node of the neighboring nodes having entered the shaded area, UWB communication with a second node located outside the shaded area; and
correcting a current position of the first neighboring node using relative position information of the first neighboring node calculated through the UWB communication with the second node, GPS location information of the first neighboring node before entering the shaded area, precision map information, or a dead reckoning algorithm.

9. The method of claim 4, further comprising, based on a number of nodes having entered the shaded area exceeding a preset number, grouping the nodes located in the shaded area with the neighboring nodes located outside the shaded area into a plurality of groups and forming a subnet for each group of the plurality of groups.

10. The method of claim 9, wherein forming the subnet is performed so that a total number of hops between each of the nodes does not exceed a second preset number.

11. A node positioning method, the method comprising:
transmitting an ultra-wideband (UWB) signal by a mobile node having entered a shaded area where a GPS signal is not received;
performing communication, among neighboring nodes located outside the shaded area and receiving the transmitted UWB signal and among the neighboring nodes and the mobile node, to establish a wireless network connection among the neighboring nodes receiving the transmitted UWB signal and the mobile node;
calculating a relative position of the mobile node;
calculating a current position of the mobile node based on a number of neighboring nodes that have received the transmitted UWB signal; and
after passing through the shaded area, correcting, by the mobile node, the current position of the mobile node after passing through the shaded area based on location information of the mobile node in the shaded area and GPS information of the mobile node after passing through the shaded area.

12. The method of claim 11, wherein calculating the relative position of the mobile node comprises receiving, by at least two of the neighboring nodes having GPS information, the UWB signal, to calculate the relative position of the mobile node based on the GPS information of the at least two of the neighboring nodes.

13. The method of claim 12, wherein calculating the relative position of the mobile node comprises calculating the relative position of the mobile node based on a triangulation.

14. The method of claim 12, further comprising correcting, by the mobile node, the current position of the mobile node in the shaded area using information about the relative position of the mobile node, GPS information of the mobile node before entering the shaded area, precision map information, or a dead reckoning algorithm.

15. The method of claim 11, wherein calculating the current position of the mobile node comprises, based on a number of the neighboring nodes receiving the signal and having GPS information being less than two, calculating, by the mobile node, the current position of the mobile node in the shaded area using GPS information of the mobile node before entering the shaded area, precision map information, or a dead reckoning algorithm.

16. The method of claim 11, further comprising:

receiving, by a first neighboring node of the neighboring nodes, the relative position of the mobile node through a vehicle-to-vehicle (V2V) communication; and correcting a current position of the first neighboring node using GPS information of the first neighboring node, the relative position of the mobile node, distance information between the mobile node and the first neighboring node, or precision map information.

17. The method of claim 11, wherein the mobile node, after passing through the shaded area, discontinues the wireless network connection based on a number of nodes, including the mobile node, having passed through the shaded area exceeding two.

* * * * *